United States Patent
Cordier et al.

[11] 3,865,821
[45] Feb. 11, 1975

[54] PROCESS FOR THE PREPARATION OF DIHYDROMETOXAZINONE DERIVATIVES AND PRODUCTS SO OBTAINED

[76] Inventors: Paul Cordier, Strasbourg; Louis Jung, Strasbourg Cronenbourg; Raymond Hug, Eckbolshein, all of France

[22] Filed: Aug. 23, 1972

[21] Appl. No.: 282,903

[52] U.S. Cl....... 260/244 R, 260/340.9, 260/465 D, 424/248
[51] Int. Cl........................................... C07d 87/08
[58] Field of Search ..................................... 260/244

[56] References Cited
UNITED STATES PATENTS
3,723,442   3/1973   Nakanishi et al................... 260/244

*Primary Examiner*—Harry I. Moatz
*Attorney, Agent, or Firm*—Young and Thompson

[57] ABSTRACT

Dihydrometoxazinone derivatives with an antihypertensive action are prepared by condensing a cyano ester of general formula:

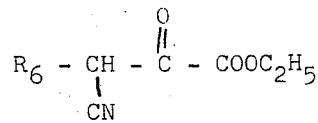

in which $R_6$ is a substituted or unsubstituted phenyl group with an aldehyde or a ketone, the condensation being carried out in an acid medium in the presence of acetic anhydride. The resulting derivatives may then be reduced or the lactime form thereof may be acetylated.

7 Claims, No Drawings

PROCESS FOR THE PREPARATION OF DIHYDROMETOXAZINONE DERIVATIVES AND PRODUCTS SO OBTAINED

BACKGROUND OF THE INVENTION

1. Field of the Invention

This invention relates to processes for the production of dihydrometoxazinone derivatives having an antihypertensive action, and to the derivatives so produced.

SUMMARY

According to the invention a process for producing derivatives of dihydrometoxazinones of the general formula:

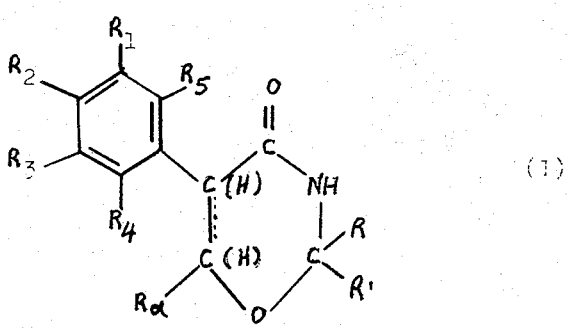

(I)

and

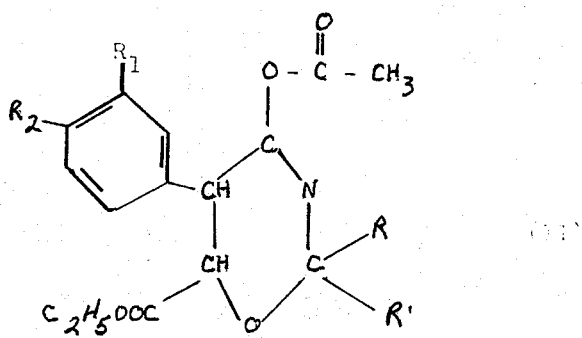

in which $R_1$ is selected from the group consisting of H, $CH_3$, $OCH_3$, $SCH_3$ and OH; $R_2$ is selected from the group consisting of H, $CH_3$, $OCH_3$, $SCH_3$, Cl, F and OH; $R_3$ is selected from the group consisting of H, $OCH_3$, $SCH_3$ and OH; or $R_2$ and $R_3$ together form the group -O-$CH_2$-O-; $R_4$ is selected from the group consisting of H, Cl, OH, $OCH_3$ and $SCH_3$; $R_5$ is selected from the group consisting of H, Cl, OH, $OCH_3$ and $SCH_3$; $R\alpha$ is selected from the group consisting of $COOC_2H_5$, — $COOCH_3$, —COOK, —COONa, —COONH$_4$, —CONH—NH$_2$, —COOC$_3H_7$ and —COOC$_4H_9$; R is selected from the group consisting of H, $CH_3$ $CH_2Cl$, $C_2H_5$, $C_3H_7$ and $C_4H_9$; R' is selected from the group consisting of $CH_3$, $C_2H_5$, $C_6H_5$, $C_6H_4(OCH_3)_p$, $C_6H_4(Cl)_p$ and $C_6H_4(SCH_3)_p$ and

is selected from the group consisting of $C_6H_{10}$, (2)$ClC_6H_9$ and $CH_3$-$C_6H_9$; comprises condensing a carbonyl compound with a cyano ester in an acid medium, i.e., at a pH lower than 7 in the presence of acetic anhydride, At least one of the substituents $R_1$, $R_2$, $R_3$, $R_4$ and $R_5$ may be selected to be different from H.

In practice the cyano ester generally is a derivative of ethyl alpha-cyanophenylpyruvate of the general formula:

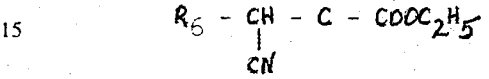

in which the substituent $R_6$ may be the radical

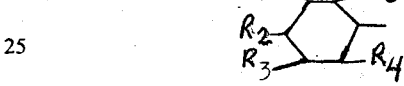

and preferably is selected from the group consisting of $C_6H_5$; p(Cl) $C_6H_4$; p(OCH$_3$) $C_6H_4$; p(SCH$_3$) $C_6H_4$; p(CH$_3$) $C_6H_4$; p(F)$C_6H_4$; m(CH$_3$) p(CH$_3$) $C_6H_3$; p(OCH$_3$)m (OCH$_3$)$C_6H_3$; p(SCH$_3$) m(SCH$_3$) $C_6H_3$; p(OH)$C_6H_4$;

p(OH)m(OH)$C_6H_3$; m(OCH$_3$)p(OCH$_3$) m(OCH$_3$) $C_6H_2$; m(SCH$_3$)p(SCH$_3$) $C_6H_3$ and m(OH)p(OH)-m(OH)$C_6H_2$; and the carbonyl compound is an aldehyde or a ketone, e.g., of general formula $$R - \overset{O}{\underset{\|}{C}} - R'.$$

Advantageously the aldehyde is selected from the group consisting of benzoic aldehyde, 4-chlorobenzaldehyde, and paramethoxybenzoic aldehyde, whilst the ketone is advantageously selected from the group consisting of cyclohexanone, acetone, monochloracetone, methylethyl ketone and 2-chlorocyclohexanone, and any substituted cyclanone.

According to an embodiment of the invention the acid medium is an aceto-sulphuric reaction medium.

Suitably in order to prepare the tetrahydro 2-3, 5-6 derivatives of formula (I) and/or (II) the dihydro 2, 3 derivative of formula (I) is first prepared and is then chemically reduced.

Generally, in an acid reaction medium of definite composition, a cyano-ester such as a derivative of ethyl alpha-cyano-phenylpyruvate is condensed with a carbonyl compound such as an aldehyde or ketone.

The derivative of ethyl alpha-cyano-phenylpyruvate used as the starting reagent is advantageously selected from the following compounds:

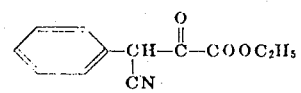

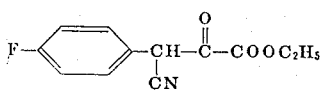

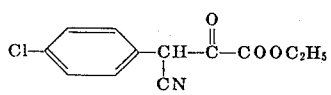

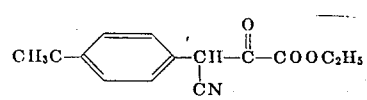

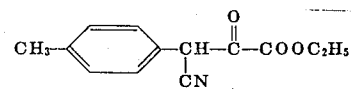

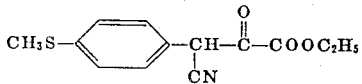

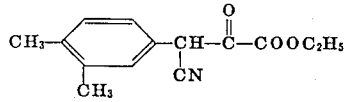

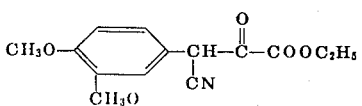

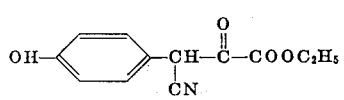

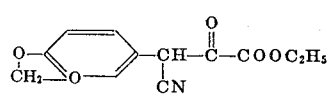

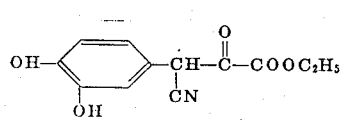

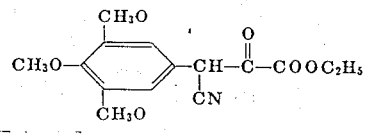

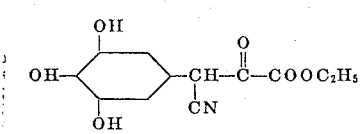

Taking the first compound of this series namely ethyl alpha-cyanophenylpyruvates, as an example, the condensation reaction with an aldehyde or a ketone can be written as follows:

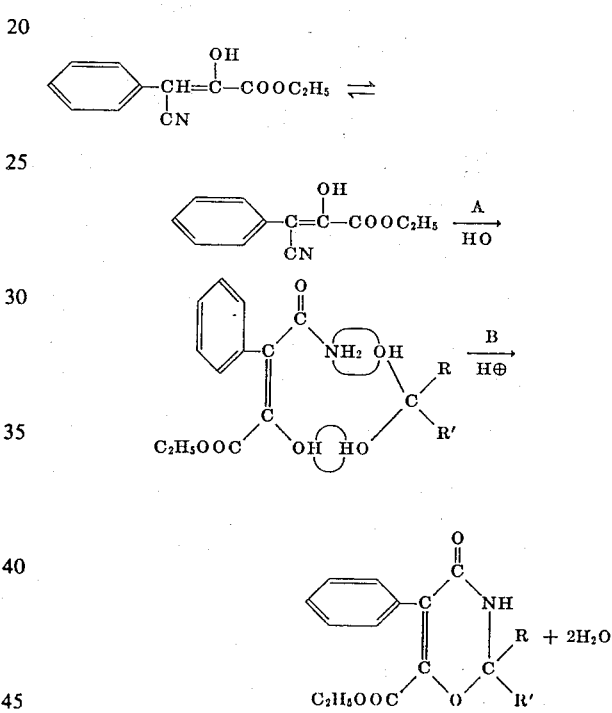

As the reaction diagram shows, the cyano-ester intervenes because of its enolic structure and causes the variation of the substituents R and R' of the aldehyde or the ketone and it is thus possible to obtain an entire series of derivatives of dihydro-2,3-metoxazinones of the formula (I). The above reaction thus takes place in two phases:

the first phase A: because of the acidity of the reaction medium, the cyano-ester is converted into the corresponding amide.

the second phase B; condensation of the amideenol with the hydrated form of the aldehyde or the ketone and the formation of the desired heterocycle oxazine-1-3-one-4.

The carbonyl compound may be a compound selected from the following:

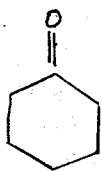 ; 

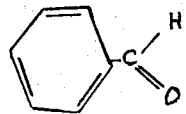 ; 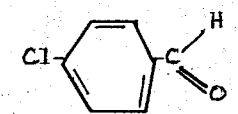 ; 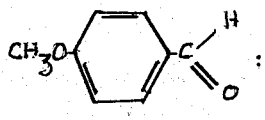 ;

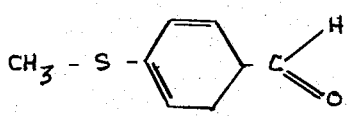

The various possible combination of substituents $R_1$, $R_2$, $R_3$, $R_4$, $R_5$ of the cyano-ester and $R$, $R'$ of the carbonyl compound thus makes it possible by a single chemical reaction to synthesise an entire family of dihydro-2-3 compounds of the formula (I).

The cyano-ester may be first prepared by, for example, condensing a substituted phenylacetic nitrile with ethyl oxalate in the presence of sodium ethylate;

The phase A of the synthesis process may be carried out by preparing a first mixture containing:
the selected cyano-ester;
acetic acid;
acetic anhydride; and
the selected carbonyl compound.

This mixture, which may be prepared at ambient temperature, is advantageously cooled to a temperature which varies according to the choice of the reaction products, but which is generally between 5° and 20°C and frequently of the order of 10° or 15°C. This cooling may be carried out, for example, by means of a thermostatic bath of cold water. A second mixture in iced water of:
concentrated sulphuric acid; and
acetic acid
may then be added dropwise to the first cooled mixture, care being taken to ensure that the temperature of the reaction medium does not exceed about 20°C. The agitation is suitably continued for 45 to 90 minutes at a temperature between 10° and 22°C. It is worth noting that experimental studies have shown that these conditions of duration of agitation and temperature are important for the yield of the reaction.

Furthermore, it has been proved that the yield was considerably improved by the presence of acetic anhydride in the reaction medium.

The dihydro-2,3-metoxazinone of the formula (I) can then be extracted from its reaction medium and purified by recrystallisation.

The corresponding derivatives with saturated heterocyclic ring, that is to say the tetrahydro-2-3, 5-6 metoxazinones of the formula (I) can be obtained from dihydro-2-3 derivatives prepared by the hydrogenation of the ethylenic bond at 5 and 6 positions. The ethylenic oxazinones can be reduced by means of sodium amalgam containing 12 percent of sodium metal, in an acetic acid medium, whilst maintaining a temperature of the order of 15° to 20°C so as to ensure a high yield from the reaction.

The reduced oxazinone can be extracted by means of a suitable solvent and recrystallised, giving either fine white needles or monocrystals, or an amorphous powder corresponding to a mixture of the cis and trans isomers.

DESCRIPTION OF THE PREFERRED EMBODIMENTS

Preparation of ethylenic oxazinones of the formula (I)

EXAMPLE I

The preparation of:

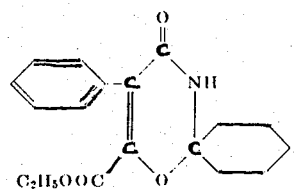

A 600-ml beaker containing 22 g of ethyl alphacyanopyruvate, 90 mls of analytically pure anhydrous acetic acid, 30 mls of analytically pure acetic anhydride and 12 mls of cyclohexanone was placed on a magnetic agitator.

The mixture was cooled by means of a thermostatic bath of cold water at 10°C and then subjected to agitation whilst a mixture containing 15 mls of concentrated sulphuric acid and 30 mls of acetic acid, cooled in iced water was added dropwise thereto. This addition caused the reaction medium to heat up, but the temperature rise was controlled so that the reaction temperature did not exceed 20°C. The agitation was continued for 45 minutes at about 15°C and then 15 minutes at ambient temperature. An extraction was then carried out with ether, adding 200 mls of diethyl ether. The resulting etherified solution was poured into a separating funnel and then 400 mls of water were added; after agitation the ether phase was collected; the residual aqueous phase was extracted three times using 100 mls of diethyl ether each time. The ether phases were combined in the separating funnel and neutralised by the addition of a 1/10 solution of potassium bicarbonate, added until the effervescence ceased. The neutralised etherified layer was washed twice, on each occasion with 500 mls of distilled water, and was then allowed to stand for 24 hours; crystallisation of the condensation product was observed at the ether/water interface.

The product was filtered using a Buchner funnel and washed with distilled water. The product, pale yellow due to the presence of impurities, was dissolved in ethanol at 95°C on a hot water bath, and the solution was then cooled, and a quantity of cold distilled water sufficient to recrystallise the product was added whilst agitating the cooled solution. After allowing the resulting mixture to stand for 6 hours, the recrystallised product was collected on a Buchner funnel. By washing with distilled water and drying to constant weight in an oven at 80°C 20.5 g of fine white needles with a melting point of 150°C (yield: approximately 64.2 percent), were obtained.

EXAMPLE II

The preparation of:

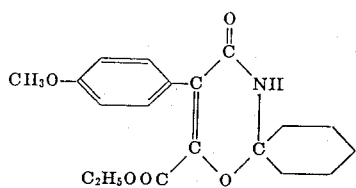

12 g of paramethoxylated ethyl alpha-cyanophenylpyruvate, 45 mls of anhydrous acetic acid, 15 mls of acetic anhydride and 6 mls of cyclohexanone were introduced into a beaker and heated as described in Example 1. A mixture containing 5 mls of concentrated sulphuric acid and 15 mls of acetic acid was then added dropwise to the resulting mixture. The procedure of Example 1 was followed; the period of agitation being 1 hour at 10°C and 10 minutes at ambient temperature.

The product was extracted and purified as described in Example I and 13.5 g of fine white needles with a melting point of 160°C (yield: 80.5 percent) were obtained.

EXAMPLE III

The preparation of:

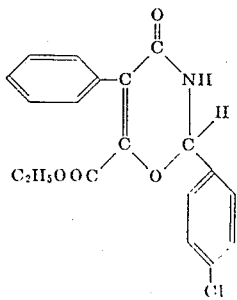

Using the procedure of Example 1 a first mixture containing 11 g of ethyl alpha-cyanophenylpyruvate, 7 g of chlorobenzaldehyde, 45 mls of acetic acid and 15 mls of acetic anhydride was prepared and subsequently treated as described in Example 1. A mixture containing 5 mls of sulphuric acid and 15 mls of acetic acid was then added to the first mixture. The subsequent periods of agitation were ¾ hour at 15°C and ¼ hour at ambient temperature. After extraction with diethylether ether and recrystallisation from acetic acid 3 grams of a white powder with a melting point of 175°C (Yield: 16.5 percent) were obtained.

The preparation of oxazinones with a saturated ring of the formula (I)

EXAMPLE IV

The preparation of:

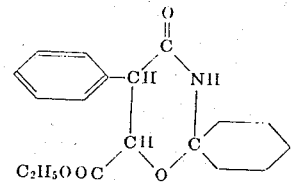

6.3 g of the following compound, prepared as described in Example 1

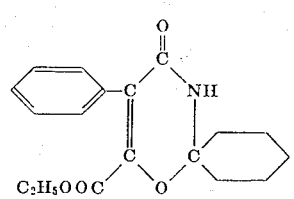

were dissolved in the cold or on a lukewarm water bath in 200 mls of anhydrous acetic acid. The vessel containing the acetic acid solution was placed in a cold thermostatic bath on a magnetic agitator and the temperature was maintained at between 10°C and 20°C (10°C being the temperature at which the reduction commences). 500 g of 12 percent sodium amalgam was added in small portions whilst the reaction mixture was maintained under violent agitation so as to ensure a vigorous contact between the amalgam and the dissolved product. Each portion of amalgam was added only after the end of the evolution of molecular hydrogen. As the reaction is exothermic care was taken to ensure that the temperature of the reaction medium did not exceed 20°C. In this procedure, when the solution thickens, 50 mls of acetic acid may be added.

After reduction, the reaction mixture and the mercury were poured into a separating funnel. The mercury was recovered, and washed with a few millilires of acetic acid, which were then added to the main acetic acid solution. The resulting acetic acid solution was neutralised with 1/10 potassium bicarbonate and a milky mixture, with the oily reduced product floating on top was obtained. The acidity was completely neutralised by means of powder potassium bicarbonate and the reduction produce was salted out.

The extraction was carried out by treating the solution with chloroform and the chloroform was distilled off under a partial vacuum. After the total evporation of the solvent, the reduction product remained at the bottom of the flask in the form of a colourless or pale yellow oil which may sometimes crystallise spontaneously. The oil was dissolved in hot ethanol at 95°C and then recrystallised by cooling and wetting the alcoholic solution with water.

The product was recovered on a Buchner funnel, washed and then dried at 80°C. 50.9 grams of fine white needles, the melting point of which is 141°C (yield: approximately 94 percent) were obtained.

EXAMPLE V

The preparation of:

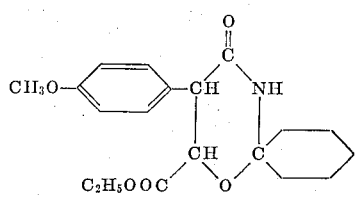

6.5 g of the compound

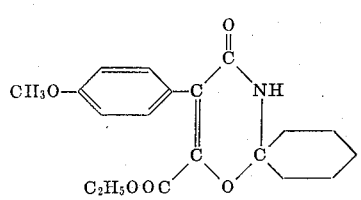

prepared as described in Example (II) above, were dissolved in the cold or on a hot water bath in 200 mls of acetic acid, and were reduced with 500 g of 12 percent sodium amalgam under conditions identical to those of the general method of the Example IV.

After recrystallisation in ethanol and water and after allowing the solution to stand for 24 hours 5.5 g of product whose melting point is 162°C (yield: approximately 85 percent) was obtained.

In all these one obtains the mixture of two of the cis and trans isomeric forms. The separation of the two forms may be carried out by fractional crystallisation.

The ethylenic oxazinones and the saturated oxazinones are molecules which possess in particular antihypertensive properties and can be modified structurally so as to improve their various characteristics, for example solubility, ease of absorption, speed of antihypertensive action and the intensity of this action. Thus, starting off from saturated derivatives of the general formula (I) having an ethyl ester function at 6 on the oxazinone ring, it has been found possible for example to prepare saturated derivatives of the general formulae (I) for this R$\alpha$ COOC$_2$H$_5$, and of the general formula (II).

The preparation of derivatives of the formula (I) in which R$\alpha$ COOC$_2$H$_5$ can be carried out as follows: the ethyl ester function of the carbon in position 6 on the oxazinone ring of general formula (I) may be converted by controlled saponification into a carboxylic acid. Starting off from such an acid, the corresponding water-soluble alkali salts of sodium, potassium, ammonium can be prepared. It should be observed that the potassium salt may be of additional therapeutical interest for the molecule because of the fact that it supplies the K$^+$ ion. The acid function may also be converted into the methyl ester by the action of the diazomethane on the acid. This conversion may be interesting from the pharmacological point of view. By this method the corresponding derivatives of the formula (I) in which R$\alpha$ COOC$_2$H$_5$ can be obtained with a yield higher than 99 percent. By reacting hydrazine hydrate on the ethyl ester function one obtains the corresponding hydrazide of the formula (I); this conversion is important because it makes it possible on the one hand to obtain water-soluble saturated derivatives of the formula (I), and on the other hand to obtain a pharmacological synergism by introducing the hydrazide group.

The compound:

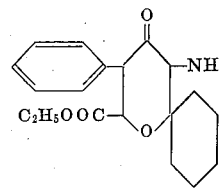

as well as all the other derivatives of the present series presents a phenomenon of mesomerism at the level of the carbon atom in position 4 and the nitrogen atom in position 3; in solution there is established an equilibrium of the keto-enolic lactam/lactim type. The controlled acetylation of the lactim form yields an enol acetate according to the following reaction formula:

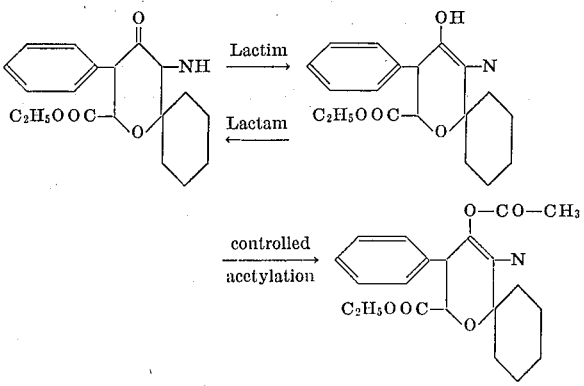

Thus compounds of the formula (II) are obtained. The acetylation, extraction, and purification are generally carried out with a yield of 80 percent. Moreover, this conversion could have important consequences on a pharmacological level, since very often the acetylation of a drug makes it more active.

From tests which have been carried out it has been found that the substituents R and R' of the derivatives of formulae (I) and (II) seem to be of interest for the purpose of carrying the active molecule to its receptor in the body; whereas the substituents R$_1$, R$_2$, R$_3$, R$_4$ and R$_5$ are interesting from the point of view of the activity of the product. The respective activities of the compounds:

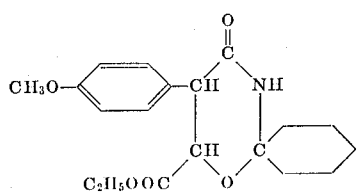

(A)

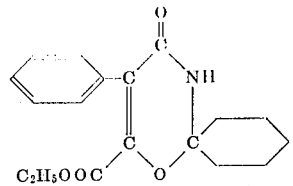

(B)

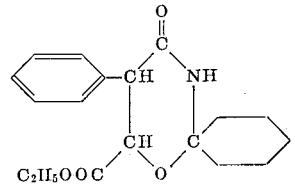

(C)

prepared in accordance with the above Examples have been classified in the order of sequence (a) (b) (c); the products (a) being much more active than the others.

It has been found that the appearance of the antihypertensive action of the metaxozinone derivatives of general formulae (I) and (II) depends on two factors; the hydrogenation of the heterocycle; and the substitution of the benzene ring.

Comparing the structures of the catecholamines:

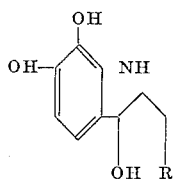

R = H: Noradrenaline
R = CH$_3$ Adrenaline which are the active principles of the adrenal capsules which cause hypertension, with those of the oxazinones with a good antihypertensive activity:

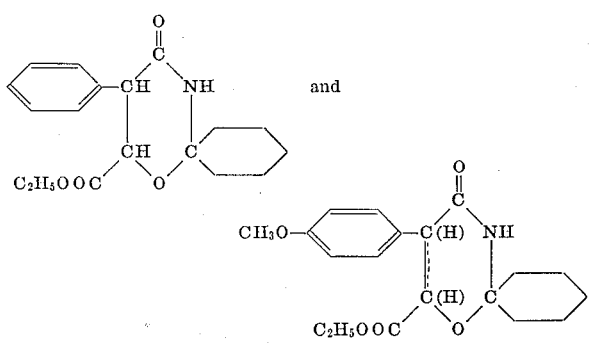

one can see a certain analogy in conformation. The substituents R$_1$ and R$_2$, provided they are not metabolisable, could contribute to "hooking" the molecule more strongly to its receptor, essentially in the manner of adrenaline and noradrenaline. As regards the substituents

the cyclohexyl group is important in order to maintain the antihypertensive action, it is possible that this group intervenes because of its lipophilia in the carrying of the product towards the receptors.

The derivatives according to the invention permit the preparation of pharmaceutical compounds with an antihypertensive action, for example by incorporation in a pharmaceutical carrier.

Furthermore, the derivatives of the series of the dihydro-2,3-metaxazinones may serve as reference reagents for the standardisation of titration solutions of the N/10 alkali metal methylate solution type, as is shown by the example given below:

An accurately weighed sample P of between 0.100 g and 0.200 g of ethyl-6-oxo-4-dihydro-2,3-metoxazine spirocyclohexyl-2-phenyl-5-carboxylate was placed in a 150 ml conical flask.

The sample was then dissolved in a solvent of the following composition:

dimethylformamide, analytical reagent 200 mls
piperidine analytical reagent 50 mls Two drops of a 0.5 percent solution of phenolphthalene were added to the dimethylformamide.

The flask was then placed on a mechanical agitator and air N/10 sodium methylate solution was added by means of a burette graduated in 1/100 ml. The end point is reached when the solution turns from light yellow to orange-red yellow, and this colouration must remain stable for at least 30 seconds.

If N is the required content of the sodium methylate solution, $n$ is the number of mls of sodium methylate solution run in during a blank test without the dihydro-2,3-metoxazine derivative, $n'$ is the number of mls of sodium methylate solution run in during the determination, the exact content of the sodium methylate solution is:

N 32 {P/[0.315 × ($n'-n$)]}

It should be observed that all the derivatives of the series of dihydro-2,3-metoxazines can serve in this way as a reference substance for the titration of solutions of sodium methylate, potassium methylate and lithium methylate.

Under the experimental conditions described, all the derivatives of the above series behave as mono-acids and are very stable in the dry state.

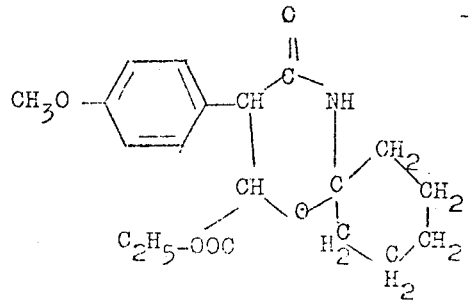

We claim:

1. A process for the preparation of a derivative of 2,-3,5,6-tetrahydrometoxazinone with a hypertensive action of the formula

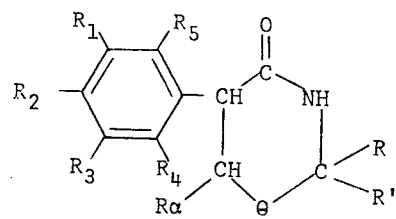

in which R$_1$ is selected from the group consisting of H, CH$_3$, OCH$_3$, SCH$_3$ and OH; R$_2$ is selected from the group consisting of H, CH$_3$, OCH$_3$, SCH$_3$, Cl, F and OH; R$_3$ is selected from the group consisting of H, OCH$_3$, SCH$_3$ and OH; R$_4$ is selected from the group consisting of H, Cl, OH, OCH$_3$ and SCH$_3$; R$_5$ is selected from the group consisting of H, Cl, OH, OCH$_3$ and SCH$_3$; R$\alpha$ is selected from the group consisting of COOCH$_3$, COOC$_2$H$_5$, COOC$_3$H$_7$, COOC$_4$H$_9$, COONa, COOK, COONH$_4$ and CONH-NH$_2$; R and R' are selected together from the group consisting of R= -H, -CH$_3$; -CH$_2$Cl, -C$_2$H$_5$, -C$_3$H$_7$, -C$_4$H$_9$ R'= -CH$_3$, -C$_2$H$_5$, -C$_6$H$_4$(OCH$_3$)p, -C$_6$H$_4$(Cl)p, -C$_6$H$_4$(SCH$_3$)p

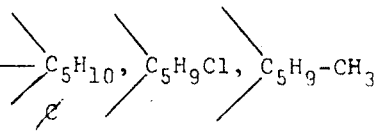

said process comprising forming a mixture of a cyanester of the formula

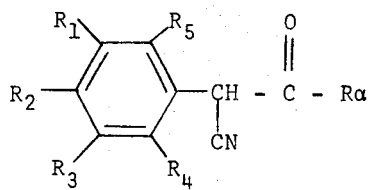

and a carbonyl compound of formula

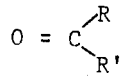

and acetic anhydride and acetic acid at a temperature between 5° and 20°C. thereby to form the amide corresponding to said cyanester, adding acetic acid and concentrated sulfuric acid to the reaction medium containing said amide at a temperature between 10° and 22°C. to make a 2,3-dihydrometoxazinone derivative, extracting said dihydrometoxazinone, and reducing said dihydrometoxazinone derivative in an acetic acid medium by means of sodium amalgam containing 12 percent of sodium metal while maintaining a temperature of the order of 15° to 20°C. to obtain the corresponding 2,3,5,6-tetrahydrometoxazinone.

2. A process as claimed in claim 1, wherein at least one of the substituents $R_1$, $R_2$, $R_3$, $R_4$ and $R_5$ is selected to be different from H.

3. A process as claimed in claim 1, in which the cyanoester is a derivative of ethyl alpha-cyanophenylpyruvate of the following formula:

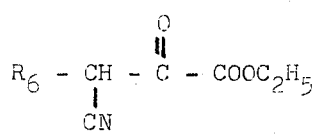

in which: $R_6$ is selected from the group consisting of $C_6H_5$; $p(Cl)C_6H_4$; $p(OCH_3)C_6H_4$; $p(SCH_3)C_6H_4$; $p(CH_3)C_6H_4$; $p(F)C_6H_4$; $m(CH_3)$ $p(CH_3)C_6H_3$; $p(OCH_3)m(OCH_3)C_6H_3$; $p(SCH_3)m$ $(SCH_3)$ $C_6H_3$; $p(OH)C_6H_4$; $p(OH)m(OH)C_6H_3$; $m(OCH_3)p$ $(OCH_3)$ $m(OCH_3)$ $C_6H_2$; $m(SCH_3)p(SCH_3)C_6H_3$; and $m(OH)$-$p(OH)m$ $(OH)C_6H_2$.

4. A process as claimed in claim 3, in which the carbonyl compound is an aldehyde selected from the group consisting of benzaldehyde, 4-chlorobenzaldehyde, and paramethoxy-benzaldehyde.

5. A process as claimed in claim 3, in which the carbonyl compound is a ketone selected from the group consisting of cyclohexanone, acetone, monochloracetone, methylethyl ketone and 2-chlorocyclohexanone.

6. A derivative of 2,3,5,6-tetrahydrometoxazinone of the formula:

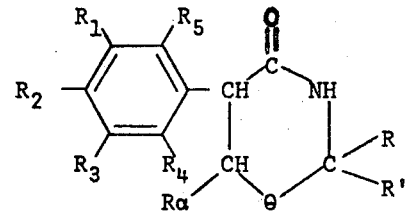

in which $R_1$ is selected from the group consisting of H, $CH_3$, $OCH_3$, $SCH_3$ and OH; $R_2$ is selected from the group consisting of H, $CH_3$, $OCH_3$, $SCH_3$, Cl, F and OH; $R_3$ is selected from the group consisting of H, $OCH_3$, $SCH_3$, and OH; $R_4$ is selected from the group consisting of H, Cl, OH, $OCH_3$ and $SCH_3$; $R_5$ is selected from the group consisting of H, Cl, OH, $OCH_3$ and $SCH_3$; $R\alpha$ is selected from the group consisting of $COOCH_3$, $COOC_2H_5$, $COOC_3H_7$, $COOC_4H_9$, $COONa$, COOK, $COONH_4$, $CONH$—$NH_2$; R and R' are selected together from the group consisting of

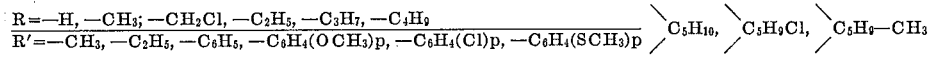

7. A derivative of tetrahydrometoxazinone of the formula